United States Patent
Nordstrom et al.

(10) Patent No.: US 10,145,356 B1
(45) Date of Patent: Dec. 4, 2018

(54) NODES FOR MULTIPLE AERIAL VEHICLES CONNECTED TO A SINGLE GROUND STATION

(71) Applicant: X DEVELOPMENT LLC, Mountain View, CA (US)

(72) Inventors: Charles Nordstrom, Berkeley, CA (US); Robbie Philip Su, Mountain View, CA (US); Elias Wolfgang Patten, Seattle, WA (US); Joel Fraser Atwater, Mountain View, CA (US); Fort Felker, Mountain View, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 15/669,008

(22) Filed: Aug. 4, 2017

(51) Int. Cl.
*F03D 1/02* (2006.01)
*F03D 1/06* (2006.01)
*F03D 5/00* (2006.01)

(52) U.S. Cl.
CPC ............... *F03D 1/02* (2013.01); *F03D 1/065* (2013.01); *F03D 5/00* (2013.01); *F05B 2240/921* (2013.01)

(58) Field of Classification Search
CPC ............... F03D 1/02; F03D 1/065; F03D 5/00
See application file for complete search history.

(56) References Cited

U.S. PATENT DOCUMENTS

| | | | |
|---|---|---|---|
| 7,448,597 B2 | 11/2008 | Jacobson et al. | |
| 7,934,698 B2 | 5/2011 | Ball et al. | |
| 9,056,677 B1* | 6/2015 | Jensen | B64C 31/06 |
| 9,234,504 B1* | 1/2016 | Granat | F03D 11/00 |
| 9,705,302 B1* | 7/2017 | Patten | H02G 15/04 |
| 2006/0017047 A1 | 1/2006 | Calver | |
| 2010/0032949 A1* | 2/2010 | Varrichio | F03D 5/00 290/44 |
| 2010/0032956 A1* | 2/2010 | Varrichio | F03D 5/00 290/55 |
| 2010/0221112 A1* | 9/2010 | Bevirt | F03D 5/00 416/135 |
| 2010/0276941 A1* | 11/2010 | Zhang | F03B 17/06 290/55 |
| 2012/0086210 A1* | 4/2012 | Gray | F03D 5/00 290/55 |
| 2013/0134261 A1* | 5/2013 | Goldstein | B64C 31/06 244/155 A |
| 2013/0285377 A1 | 10/2013 | Tattersfield et al. | |
| 2015/0054282 A1* | 2/2015 | Goldstein | F03D 5/00 290/44 |

(Continued)

FOREIGN PATENT DOCUMENTS

| | | |
|---|---|---|
| EP | 2686238 | 5/2016 |
| WO | WO 2010/135604 | 11/2010 |

*Primary Examiner* — Viet Nguyen
(74) *Attorney, Agent, or Firm* — McDonnell Boehnen Hulbert & Berghoff LLP

(57) ABSTRACT

Airborne wind turbine systems with multiple aerial vehicles connected via multiple tethers to a single ground station are disclosed. A node is coupled to the tethers. The node includes a drive system. At a proximate end of the node, each of the tethers is adjacent to neighboring tethers. And at a distal end of the node, each of the tethers is separated from the neighboring tethers. The airborne wind turbine system includes a control system configured to operate the drive system to translate the node along the tethers.

15 Claims, 13 Drawing Sheets

(56) References Cited

U.S. PATENT DOCUMENTS

| | | | |
|---|---|---|---|
| 2015/0251755 A1* | 9/2015 | Schaefer | B64C 39/022 290/55 |
| 2015/0330368 A1* | 11/2015 | Goldstein | F03D 1/02 290/44 |
| 2017/0088259 A1* | 3/2017 | Chubb | B64C 39/022 |
| 2017/0107974 A1 | 4/2017 | Goessling et al. | |
| 2017/0292499 A1* | 10/2017 | Sia | F03D 7/06 |

\* cited by examiner

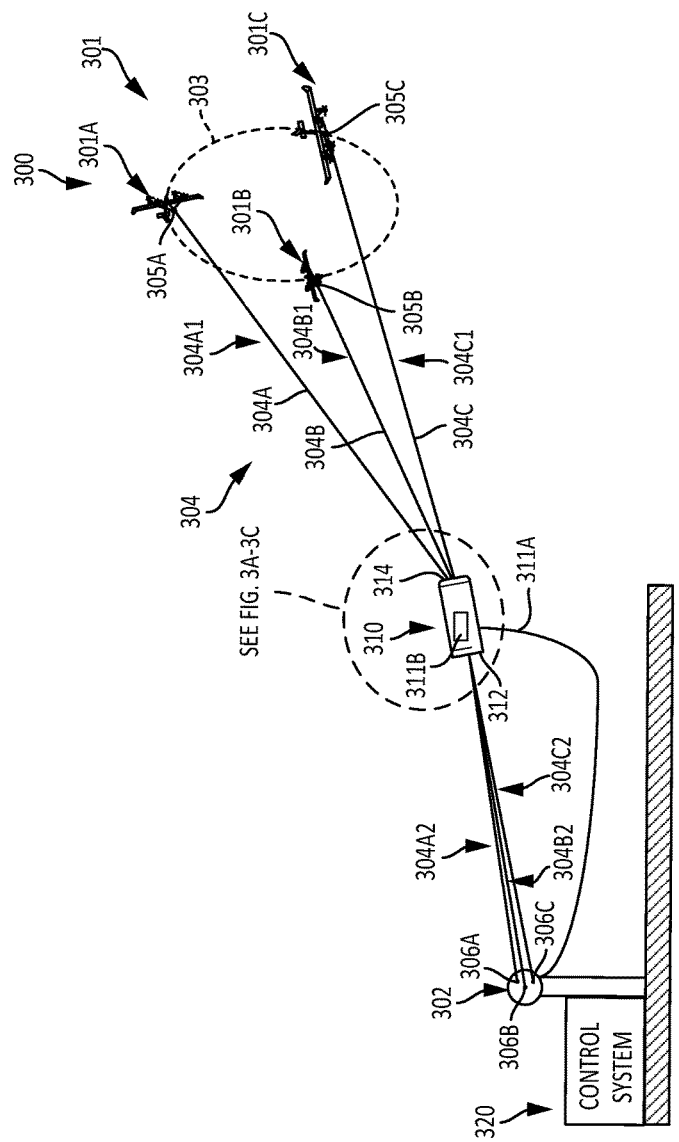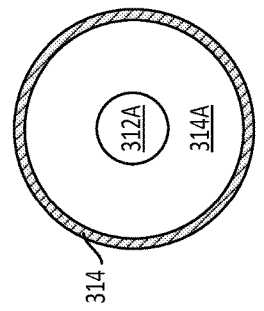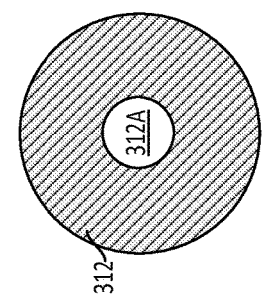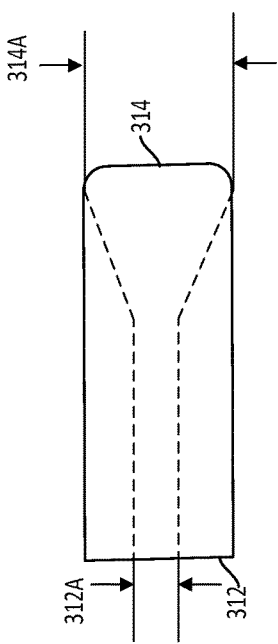

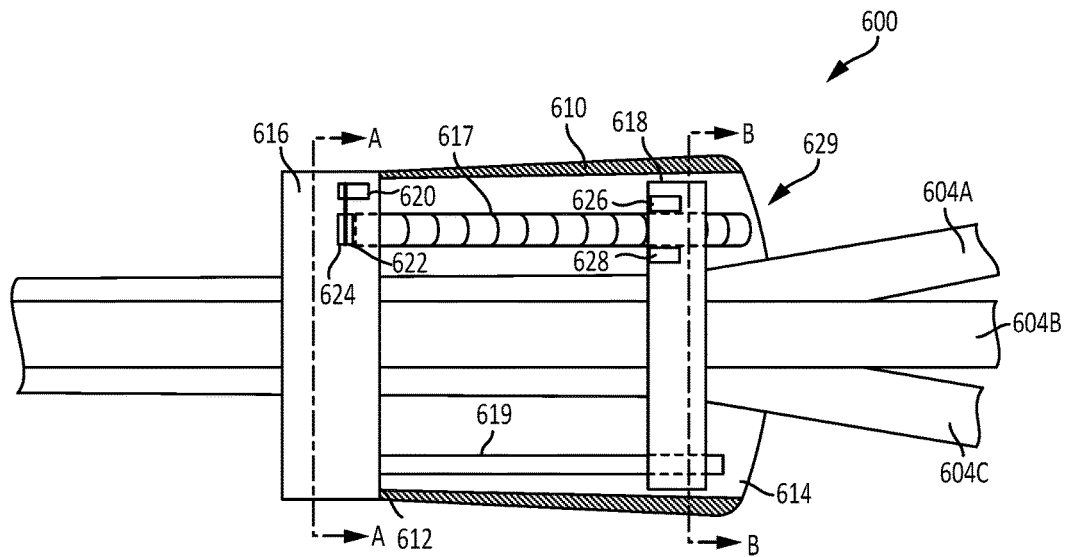
FIG. 6A
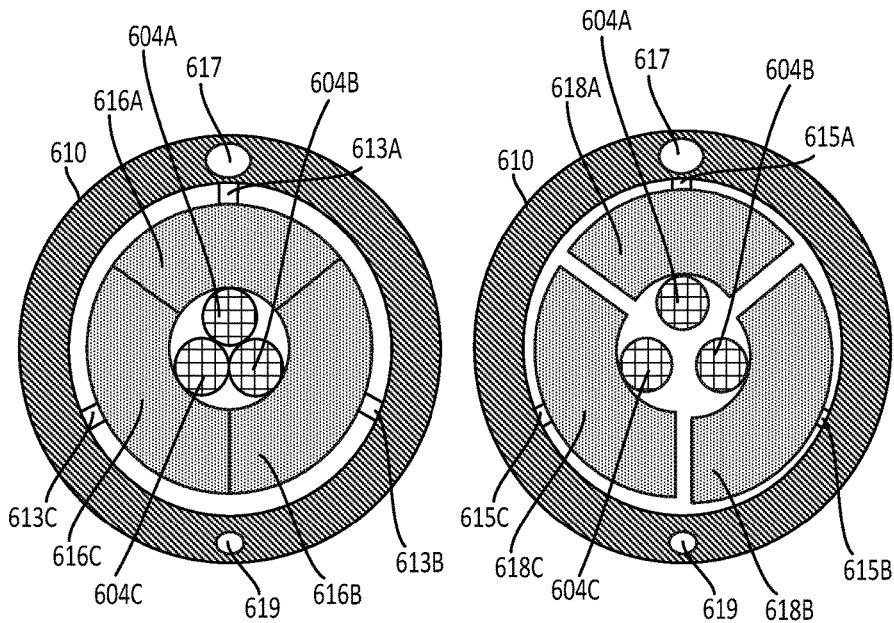
FIG. 6B
Section A-A
FIG. 6C
Section B-B

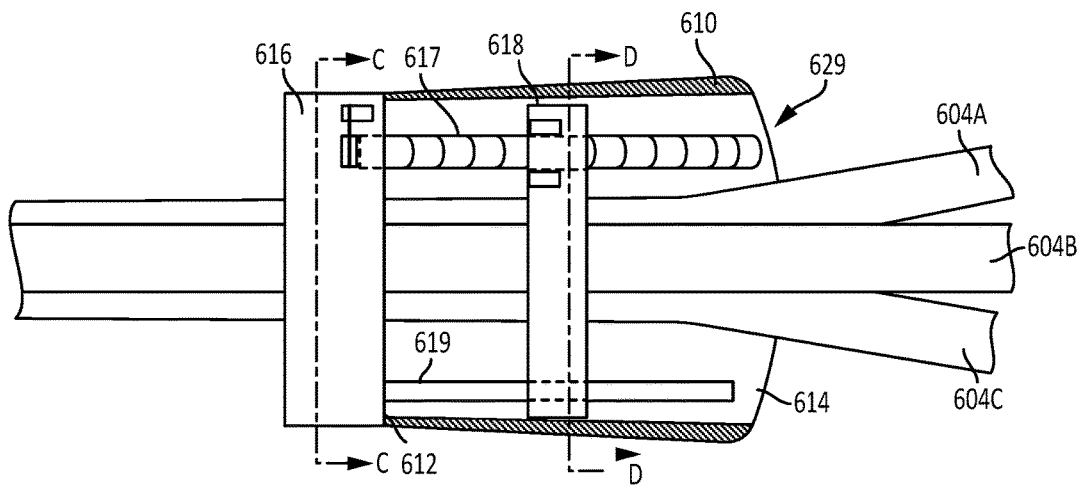
FIG. 6D
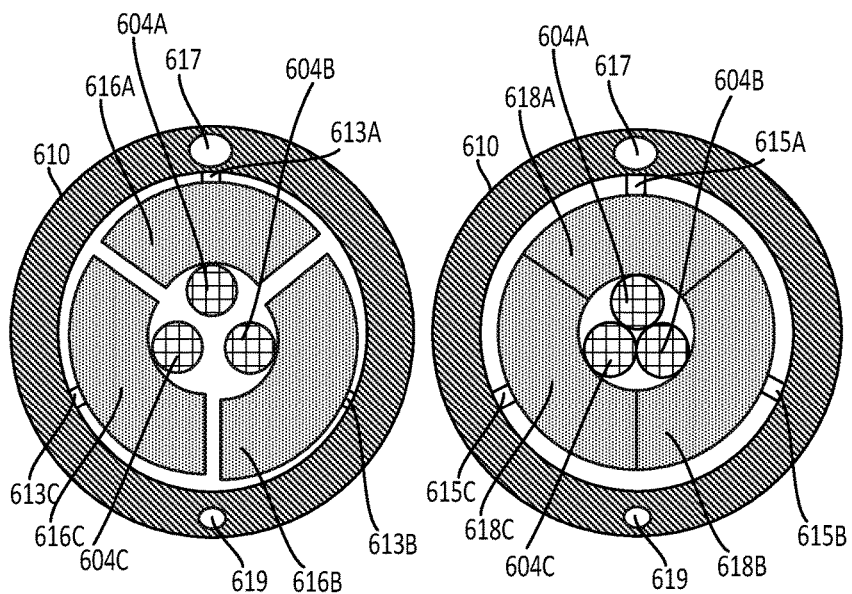
FIG. 6E
Section C-C
FIG. 6F
Section D-D

Section A-A

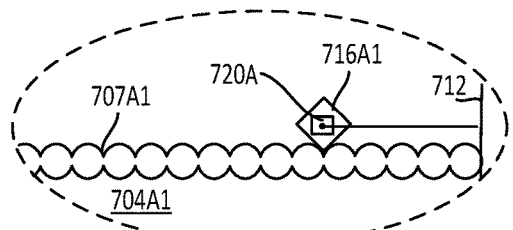
FIG. 7A1
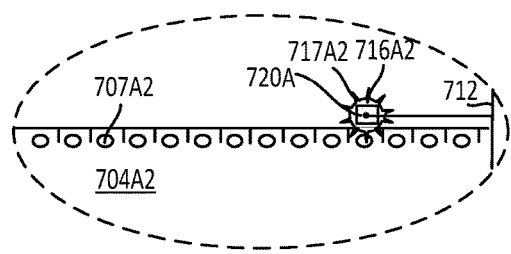
FIG. 7A2
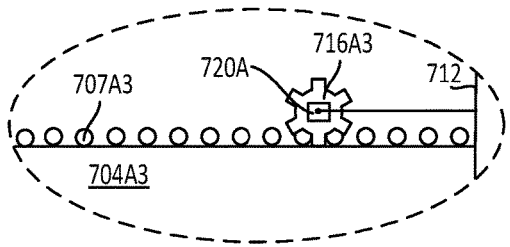
FIG. 7A3
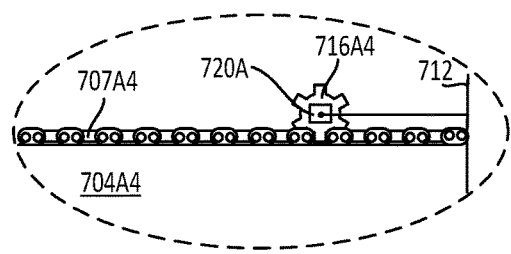
FIG. 7A4
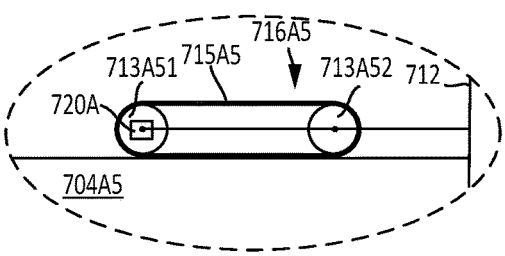
FIG. 7A5

NODES FOR MULTIPLE AERIAL VEHICLES CONNECTED TO A SINGLE GROUND STATION

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

The use of wind turbines as a means for harnessing energy has been used for a number of years. Conventional wind turbines typically include large turbine blades positioned atop a tower. The cost of manufacturing, erecting, maintaining, and servicing such wind turbine towers, and wind turbines is significant.

An alternative to the costly wind turbine towers that may be used to harness wind energy is to use an aerial vehicle attached to a ground station with an electrically conductive tether. Such an alternative may be referred to as an airborne wind turbine or AWT.

SUMMARY

Airborne wind turbines employ aerial vehicles, such as energy kites, to harness wind power and convert it to electrical energy. The generated electrical energy is transmitted to ground stations via tethers that include one or more electrical conductors. Embodiments described herein relate to or take the form of airborne wind turbine systems that include multiple aerial vehicles that fly in crosswind flight while connected to a single ground station. Multiple tethers may connect the aerial vehicles to the ground station. The tethers may be coupled to a node. Beneficially, embodiments described herein may improve generation of electrical energy during crosswind flight of the multiple aerial vehicles and/or transmission of electricity to an electrical grid.

In one aspect, an airborne wind turbine system may include a ground station; a plurality of aerial vehicles; a plurality of tethers, where each tether of the plurality of tethers comprises an electrical conductor, where a distal end of each tether of the plurality of tethers is coupled to a respective aerial vehicle of the plurality of aerial vehicles, and where a proximate end of each tether of the plurality of tethers is coupled to the ground station; a node coupled to the plurality of tethers, where the plurality of tethers pass through the node, where, at a proximate end of the node, each tether of the plurality of tethers is adjacent to neighboring tethers of the plurality of tethers, where, at a distal end of the node, each tether of the plurality of tethers is separated from the neighboring tethers of the plurality of tethers, and where the node comprises a drive system; and a control system configured to operate the drive system to translate the node along the plurality of tethers.

In another aspect, an airborne wind turbine system may include a ground station; a plurality of aerial vehicles; an auxiliary tether, where the auxiliary tether comprises an electrical conductor, and where a proximate end of the auxiliary tether is coupled to the ground station; a plurality of tethers, where each tether of the plurality of tethers comprises a second electrical conductor, where a distal end of each tether of the plurality of tethers is coupled to a respective aerial vehicle of the plurality of aerial vehicles; and a node, wherein a distal end of the auxiliary tether is coupled to the node, and wherein a proximate end of each tether of the plurality of tethers is coupled to a distal end of the node.

In another aspect, an airborne wind turbine system may include a ground station; three aerial vehicles; an auxiliary tether, where the auxiliary tether comprises an electrical conductor, and where a proximate end of the auxiliary tether is coupled to the ground station; a junction, where a distal end of the auxiliary tether is coupled to the junction; three tethers, where each tether of the three tethers comprises a second electrical conductor, where a proximate end of each tether of the three tethers is coupled to the junction, and where a distal end of each tether of the three tethers is coupled to a respective aerial vehicle of the three aerial vehicles; a node coupled to the three tethers, where the three tethers pass through the node, where, at a proximate end of the node, each tether of the three tethers is adjacent to neighboring tethers of the three tethers, where, at a distal end of the node, each tether of the three tethers is separated from the neighboring tethers of the three tethers, and where the node comprises a drive system; and a control system configured to operate the drive system to translate the node along the three tethers.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 3 depicts an airborne wind turbine system with multiple flying aerial vehicles, according to an example embodiment.

FIG. 3A depicts a side view of aspects of a node illustrated in FIG. 3, according to an example embodiment.

FIG. 3B depicts a proximate end of a node illustrated in FIG. 3, according to an example embodiment.

FIG. 3C depicts a distal end of a node illustrated in FIG. 3, according to an example embodiment.

FIG. 6A depicts a side view of a node, according to an example embodiment.

FIG. 6B depicts a cross-section view of a node along section A-A illustrated in FIG. 6A, according to an example embodiment.

FIG. 6C depicts a cross-section view of a node along section B-B illustrated in FIG. 6A, according to an example embodiment.

FIG. 6D depicts a side view a node, according to an example embodiment.

FIG. 6E depicts a cross-section view of a node along section C-C illustrated in FIG. 6D, according to an example embodiment.

FIG. 6F depicts a cross-section view of a node along section D-D illustrated in FIG. 6D, according to an example embodiment.

FIG. 7A1 depicts a square wheel arranged on a tether, according to an example embodiment.

FIG. 7A2 depicts a wheel with a plurality of protrusions arranged on a tether, according to an example embodiment.

FIG. 7A3 depicts a sprocket arranged on a tether, according to an example embodiment.

FIG. 7A4 depicts a sprocket arranged on a tether, according to an example embodiment.

FIG. 7A5 depicts a belt assembly arranged on a tether, according to an example embodiment.

DETAILED DESCRIPTION

Exemplary systems are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems and can be arranged and combined in a wide variety of different configurations, all of which are contemplated herein.

I. OVERVIEW

Example embodiments herein generally relate to land-based and offshore airborne wind turbine systems with multiple aerial vehicles connected via multiple tethers to a single ground station. The tethers may be coupled to a node. At a proximate end of the node, each of the tethers may be adjacent to neighboring tethers. And at a distal end of the node, each of the tethers may be separated from the neighboring tethers. In some embodiments, the node may be dynamic and may translate along the tethers. In such embodiments, a length of a tether portion between the node and the aerial vehicle may be variable. In other embodiments, the node may be static and might not translate along the tethers. In such embodiments, a length of a tether portion between the node and the aerial vehicle might not be variable.

II. ILLUSTRATIVE SYSTEMS

A. Airborne Wind Turbine Systems With a Single Aerial Vehicle

Figure 1:
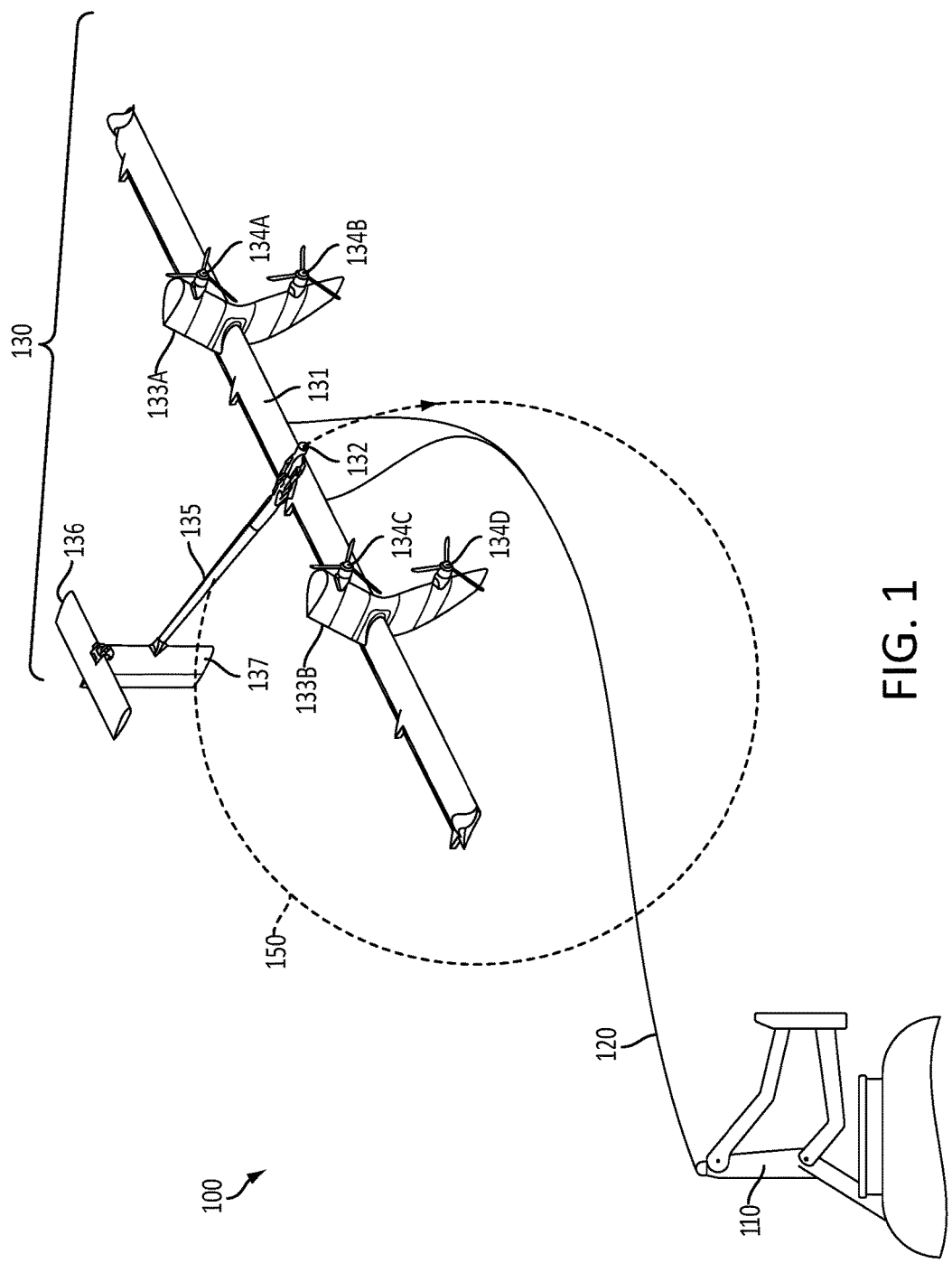
FIG. 1 depicts an airborne wind turbine system, according to an example embodiment.

FIG. 1 depicts an airborne wind turbine system 100, according to an example embodiment. In particular, the airborne wind turbine system 100 includes a ground station 110, a tether 120, and an aerial vehicle 130. As shown in FIG. 1, the aerial vehicle 130 may be connected to the tether 120, and the tether 120 may be connected to the ground station 110. In this example, the tether 120 may be attached to the ground station 110 at one location on the ground station 110, and attached to the aerial vehicle 130 at two locations on the aerial vehicle 130. However, in other examples, the tether 120 may be attached at multiple locations to any part of the ground station 110 and/or the aerial vehicle 130.

The ground station 110 may be configured to hold and/or support the aerial vehicle 130 until it is in an operational mode. The ground station 110 also may be configured to allow for the repositioning of the aerial vehicle 130 such that deployment of aerial vehicle 130 is possible. Further, the ground station 110 may be configured to receive the aerial vehicle 130 during a landing. The ground station 110 may be formed of any material that can suitably keep the aerial vehicle 130 attached and/or anchored to the ground while in hover flight, forward flight, and/or crosswind flight. In some implementations, a ground station 110 may be configured for use on land. However, a ground station 110 also may be implemented on a body of water, such as a lake, river, sea, or ocean. For example, a ground station could include or be arranged on a floating offshore platform or a boat, among other possibilities. Further, a ground station 110 may be configured to remain stationary or to move relative to the ground or the surface of a body of water.

In addition, the ground station 110 may include one or more components (not shown), such as a winch, that may vary a length of the deployed tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 also may be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. The core may be constructed of any high strength fibers. In some examples, the tether 120 may have a fixed length and/or a variable length. For instance, in at least one such example, the tether 120 may have a length of 140 meters.

The aerial vehicle 130 may include or take the form of various types of devices, such as a kite (as illustrated in FIG. 1), a wing, and/or an airplane, among other possibilities. The aerial vehicle 130 may be formed of structures of metal, plastic and/or other polymers. The aerial vehicle 130 may be formed of any material which allows for a high thrust-toweight ratio and generation of electrical energy which may be used in utility applications. Additionally, the materials may be chosen to allow for a lightning hardened, redundant and/or fault tolerant design which may be capable of handling large and/or sudden shifts in wind speed and wind direction. Other materials may be possible as well.

The aerial vehicle 130 may be configured to fly substantially along a path 150 to generate electrical energy. The term "substantially along," as used in this disclosure, refers to exactly along and/or one or more deviations from exactly along that do not significantly impact generation of electrical energy as described herein.

The path 150 may be various different shapes in various different embodiments. For example, the path 150 may be substantially circular. And in at least one such example, the path 150 may have a radius of up to 265 meters. The term "substantially circular," as used in this disclosure, refers to exactly circular and/or one or more deviations from exactly circular that do not significantly impact generation of electrical energy as described herein. Other shapes for the path 150 may be an oval, such as an ellipse, the shape of a jelly bean, the shape of the number of 8, etc.

As shown in FIG. 1, the aerial vehicle 130 may include a main wing 131, a front section 132, rotor connectors 133A-B, rotors 134A-D, a tail boom 135, a tail wing 136, and a vertical stabilizer 137. Any of these components may be shaped in any form which allows for the use of components of lift to resist gravity and/or move the aerial vehicle 130 forward.

The main wing 131 may provide a primary lift for the aerial vehicle 130. The main wing 131 may be one or more rigid or flexible airfoils, and may include various control surfaces, such as winglets, flaps, rudders, elevators, etc. The control surfaces may be used to stabilize the aerial vehicle 130 and/or reduce drag on the aerial vehicle 130 during hover flight, forward flight, and/or crosswind flight.

The main wing 131 may be any suitable material for the aerial vehicle 130 to engage in hover flight, forward flight, and/or crosswind flight. For example, the main wing 131 may include carbon fiber and/or e-glass. Moreover, the main wing 131 may have a variety dimensions. For example, the main wing 131 may have a span of 8 meters, an area of 4 meters squared, and an aspect ratio of 15. The front section 132 may include one or more components, such as a nose, to reduce drag on the aerial vehicle 130 during flight.

The rotor connectors 133A-B may connect the rotors 134A-D to the main wing 131. In some examples, the rotor connectors 133A-B may take the form of or be similar in form to one or more pylons. In this example, the rotor connectors 133A-B are arranged such that the rotors 134A-D are spaced above and below the main wing 131. In some examples, a vertical spacing between corresponding rotors (e.g., rotor 134A and rotor 134B or rotor 134C and rotor 134D) may be 0.5 to 3 meters.

The rotors 134A-D may be configured to drive one or more motor-generators for the purpose of generating electrical energy when the vehicle is operated in an electrical power generation mode. The rotors 134A-D may each include one or more blades, such as two, three, four, five, or more blades. The one or more rotor blades may rotate via interactions with the wind (or apparent wind) and be used to drive the one or more motor-generators. In addition, the rotors 134A-D also may be configured to provide a thrust to the aerial vehicle 130 during flight. With this arrangement, each of the rotors 134A-D may function as a propulsion units, such as a propeller, driven by a motor-generators when the vehicle is operated in a thrust flight mode. Although the rotors 134A-D are depicted as four rotors in this example, in other examples the aerial vehicle 130 may include any number of rotors, such as less than four rotors or more than four rotors.

The tail boom 135 may connect the main wing 131 to the tail wing 136. The tail boom 135 may have a variety of dimensions. For example, the tail boom 135 may have a length of 2 to 6 meters. Moreover, in some implementations, the tail boom 135 could take the form of a body and/or fuselage of the aerial vehicle 130. And in such implementations, the tail boom 135 may carry a payload.

The tail wing 136 and/or the vertical stabilizer 137 may be used to stabilize the aerial vehicle and/or reduce drag on the aerial vehicle 130 during hover flight, forward flight, and/or crosswind flight. For example, the tail wing 136 and/or the vertical stabilizer 137 may be used to maintain a pitch of the aerial vehicle 130 during hover flight, forward flight, and/or crosswind flight. In this example, the vertical stabilizer 137 is attached to the tail boom 135, and the tail wing 136 is located on top of the vertical stabilizer 137. The tail wing 136 may have a variety of dimensions. For example, the tail wing 136 may have a length of 1 to 5 meters. Further, in some examples, the tail wing 136 may be located above a center of mass of the aerial vehicle 130.

While the aerial vehicle 130 has been described above, it should be understood that the systems described herein could involve any suitable aerial vehicle that is connected to a tether, such as the tether 120.

B. Illustrative Components of an Airborne Wind Turbine System

Figure 2:
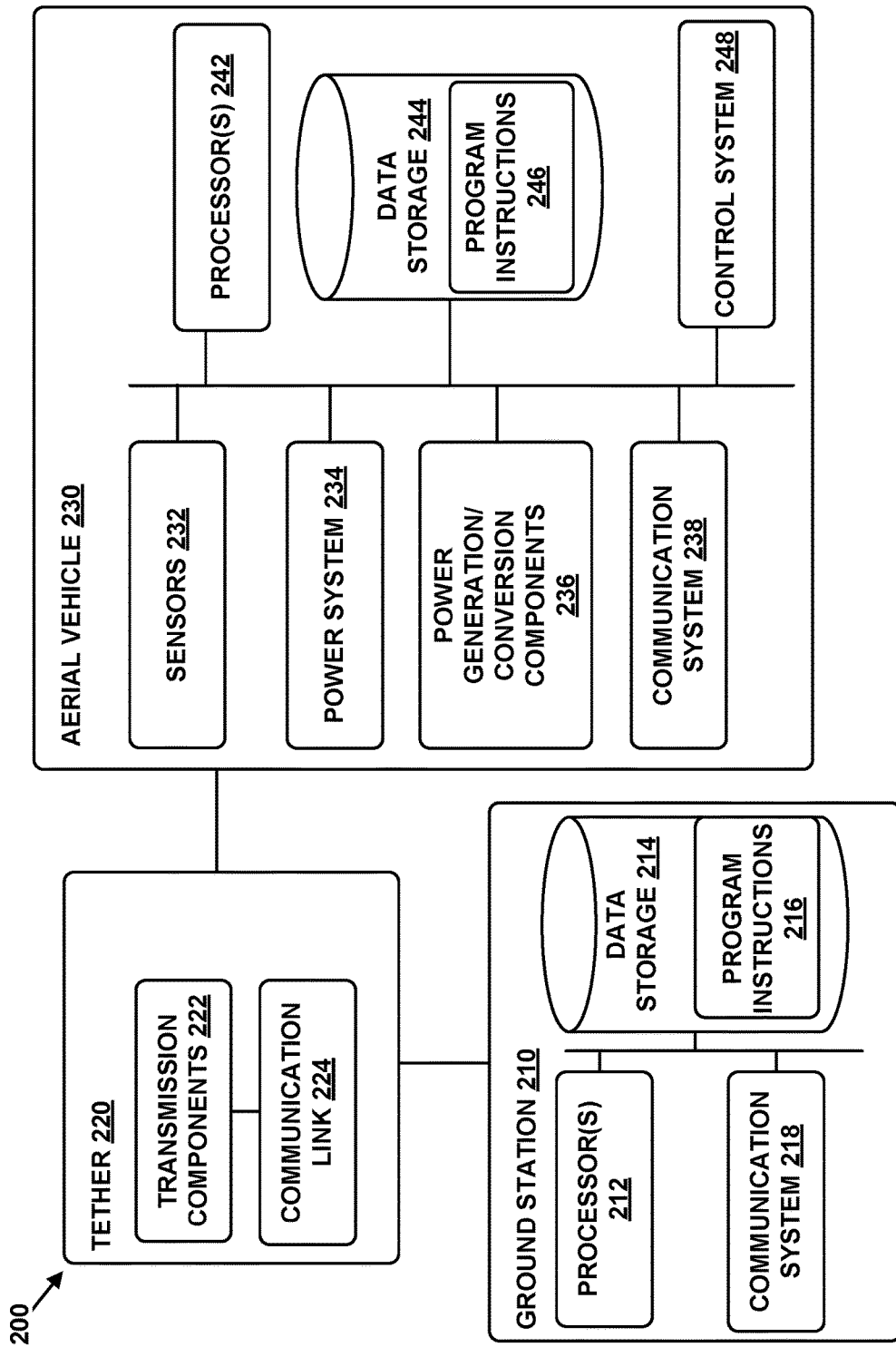
FIG. 2 is a simplified block diagram illustrating components of an airborne wind turbine system, according to an example embodiment.

FIG. 2 is a simplified block diagram illustrating components of an airborne wind turbine system 200. The airborne wind turbine system 200 may take the form of or be similar in form to the airborne wind turbine system 100. In particular, the airborne wind turbine system 200 includes a ground station 210, a tether 220, and an aerial vehicle 230. The ground station 210 may take the form of or be similar in form to the ground station 110, the tether 220 may take the form of or be similar in form to the tether 120, and the aerial vehicle 230 may take the form of or be similar in form to the aerial vehicle 130.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communications system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command station, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, and program instructions 246, and a control system 248.

The sensors 232 could include various different sensors in various different embodiments. For example, the sensors 232 may include a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the airborne wind turbine 200 to provide various functions described herein.

As another example, the sensors 232 may include one or more wind sensors, such as one or more pitot tubes. The one or more wind sensors may be configured to detect apparent and/or relative wind. Such wind data may be utilized by the airborne wind turbine 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs also may be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 326 could take various different forms in various different embodiments. For example, the power generation/conversion components 236 may include one or more motor-generators, such as high-speed, direct-drive motor-generators. With this arrangement, the one or more motor-generators may drive and be driven by one or more rotors, such as the rotors 134A-D. And in at least one such example, the one or more motor-generators may operate at full rated power at wind speeds of 11.5 meters per second at a capacity factor which may exceed 60 percent, and the one or more motor-generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 244, and the data storage 246. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the systems described herein could involve any suitable aerial vehicle that is connected to a tether, such as the tether 230 and/or the tether 110.

C. Airborne Wind Turbine Systems With Multiple Aerial Vehicles

1. Systems With a Node That May Translate Along Multiple Tethers

FIG. 3 depicts an airborne wind turbine system 300 with multiple flying aerial vehicles 301A-C connected through independent tethers 304A-C to a ground station 302. Distal ends 305A-C of the tethers 304A-C are coupled to a respective aerial vehicle 301A-C and proximate ends 306A-C of the tethers 304A-C are coupled to the ground station 302.

As illustrated, the aerial vehicles 301A-C are in crosswind flight and flying a common looping path 303. The looping path 303 is depicted as substantially circular, but as described above, the looping path 303 can take many other forms. The aerial vehicles 301A-C are capable of generating electrical energy during crosswind flight and transferring the electrical energy down one or more electrical conductors in the tethers 304A-C to the ground station 302 and ultimately to an energy sink, such as an electrical grid or energy storage system. In FIG. 3, the ground station 302 is a tower-mounted ground station located on land; however, other ground station configurations are possible, including but not limited to direct ground contact.

The airborne wind turbine system 300 includes a node 310 coupled to the tethers 304A-C. The tethers 304A-C may pass through the node 310. At a proximate end 312 of the node 310, each of the tethers 304A-C may be adjacent to neighboring tethers 304A-C. And, at a distal end 314 of the node 310, each of the tethers 304A-C may be separated from neigboring tethers 304A-C. The node 310 may divide each of the tethers 304A-C into two portions (segments). For example, the tethers 304A-C may have first tether portions 304A1-C1 between the distal end 314 of the node 310 and distal ends 305A-C, and the tethers 304A-C may have second tether portions 304A2-C2 between the proximate end 312 of the node 310 and proximate ends 306A-C. The first tether portions 304A1-C1 may rotate with a respective aerial vehicle 301A-C during crosswind flight. Further, the second tether portions 304A2-C2 might not rotate with a respective aerial vehicle 301A-C during crosswind flight.

FIGS. 3A-C depict aspects of the node 310. At the proximate end 312, the node 310 may include a proximate opening 312A. And at the distal end 314, the node 310 may include a distal opening 314A. As illustrated, a diameter of the distal opening 314A may be greater than a diameter of the proximate opening 312A. Further, in some embodiments, the distal end 314 may be beveled. For example, each of the tethers 304A-C may have a parameter (e.g., minimum bend radius) and the distal end 314 may be beveled to support the parameter of the tethers 304A-C. Moreover, in some embodiments, the distal end 314 may be curved. The diameter of the distal opening 314A and/or the curvature of the distal end 314 may help each of the tethers 304A-C separate from neighboring tethers 304A-C.

As illustrated, the lengths of each of the first tether portions 304A1-C1 may be substantially the same. Further, the lengths of each of the second tether portions 304A2-C2 also may be substantially the same. The term "substantially the same," as used in this disclosure, refers to exactly the same or one or more deviations from exactly the same that does not significantly impact generation of electrical energy as described herein (e.g., less than or equal to the span of the main wing 131 of the aerial vehicle 130).

The airborne wind turbine system 300 further includes a control system 320. The node 310 may include a drive system and the control system 320 may be configured to operate the drive system to translate the node 310 along the tethers 304A-C. With this arrangement, a position of the node 310 on the tethers 304A-C may be actively controlled. In some embodiments, the node 310 may be referred to as a dynamic node or a crawler. The drive system is not shown for clarity in FIG. 3.

Translating the node 310 along the tethers 304A-C may vary the lengths of the first tether portions 304A1-C1 and/or the lengths of the second tether portions 304A2-C2. For example, translating the node 310 towards the aerial vehicles 301A-C may decrease the lengths of the first tether portions 304A1-C1 and/or increase the lengths of the second tether portions 304A2-C2. As another example, translating the node 310 towards the ground station 302 may increase the lengths of the first tether portions 304A1-C1 and/or decrease the lengths of the second tether portions 304A2-C2. Varying the lengths of the first tether portions 304A1-C1 and/or the lengths of the second tether portions 304A2-C2 may in turn vary the size and/or location of the looping path 303.

The control system 320 may be similar in form to the control system 248. For instance, the control system 320 may be implemented with mechanical systems and/or with hardware, firmware, and/or software. As one example, the control system 320 may take the form of program instructions stored on a non-transitory computer readable medium and a processor that executes the instructions.

As illustrated, the control system 320 is coupled to the ground station 302, although other alternative or additional connections are possible. For example, the control system 320 may be coupled to the node 310, any one of the aerial vehicles 301A-C, or any one of the tethers 304A-C. In some examples, the control system 320 may be coupled to the ground station 302 the node 310, any one of the aerial vehicles 301A-C, and/or any one of the tethers 304A-C, through a wired connection or a wireless connection. The control system 320 may be implemented in whole or in part on the ground station 302 and/or at least one entity remotely located from the ground station 302, such as the node 310 and the aerial vehicles 301A-C. Generally, the manner in which the control system 320 is implemented may vary, depending upon the particular application.

Optionally, an umbilical 311A may couple the node 310 to the ground station 302. Via the umbilical 311A, the ground station 302 may be configured to provide power to the node 310. In some embodiments, the umbilical 311A may be an electrical umbilical, a pneumatic umbilical, or a hydraulic umbilical. Although the umbilical 311A is illustrated as coupled to the node 310 and the ground station 302, other alternative or additional connections are possible. For example, the umbilical 311A may be coupled to the node 310 and any one of the aerial vehicles 301A-C or any one of the tethers 304A-C. Via the umbilical 311A, the coupled aerial vehicles 301A-C or tethers 304A-C may be configured to provide power to the node 310.

Further, the node 310 may optionally include a power source 311B. In some embodiments, the power source 311B may include a battery configured to provide power to the node 310. In other embodiments, the power source 311B may include an inductive coil configured to provide power to the node 310 when the inductive coil is translated over the tethers 304A-C.

The aerial vehicles 301A-C define a plurality of aerial vehicles 301 and the tethers 304A-C define a plurality of tethers 304. Although the airborne wind turbine system 300 includes three aerial vehicles 301A-C and three tethers 304A-C, in other examples, an airborne wind turbine system may include a plurality of aerial vehicles greater than or less than three aerial vehicles and a plurality of tethers greater than or less than three tethers.

Figure 4:
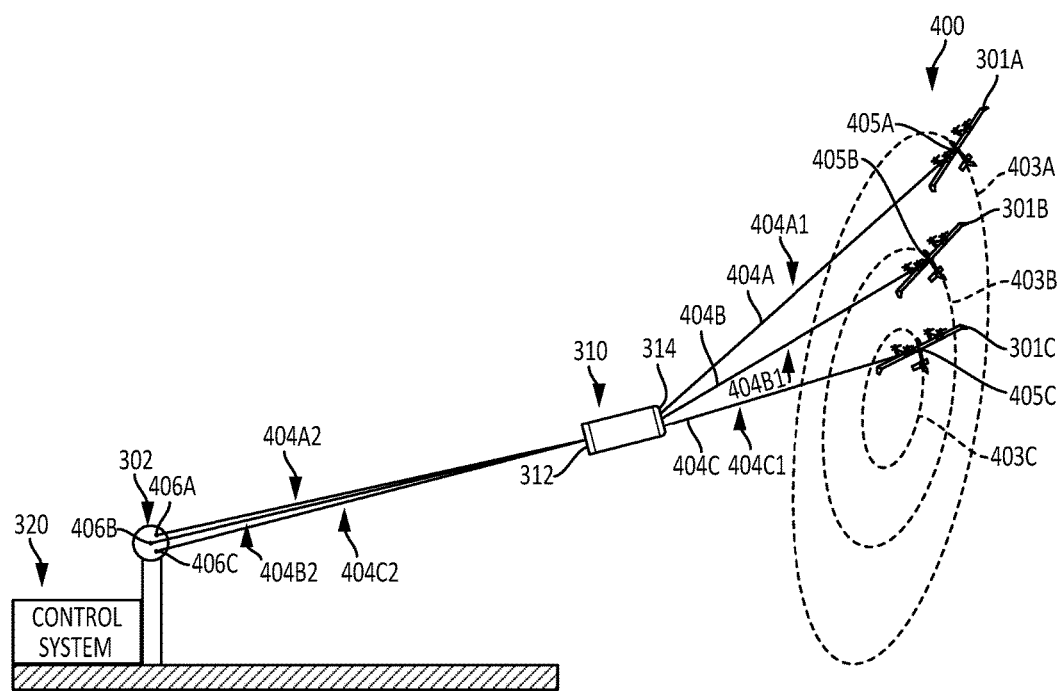
FIG. 4 depicts an airborne wind turbine system with multiple flying aerial vehicles, according to an example embodiment.

FIG. 4 depicts an airborne wind turbine system 400 with the flying aerial vehicles 301A-C connected through independent tethers 404A-C to the ground station 302. The airborne wind turbine system 400 is similar to the airborne wind turbine system 300, except that each of the tethers 404A-C has a different length than the other tethers 404A-C. With this arrangement, each first tether portions 404A1-C1 may have a different length than the other first tether portions 404A1-C1. As illustrated, the tether 404A has a greater length than tether 404B, and tether 404B has a greater length than tether 404C; and the first tether portion 404A1 has a greater length than the first tether portion 404B1, and the first tether portion 404B1 has a greater length than the first tether portion 404C1. Further, each second tether portions 404A2-C2 may have a different length than the other second tether portions 404A2-C2.

Further, as illustrated, the aerial vehicles 301A-C are in crosswind flight and flying independent looping paths 403A-C. The looping paths 403A-C are depicted as concentric with the looping path 403A having a greater circumference than looping path 403B, and the looping path 403B having a greater circumference than the looping path 403C. In the airborne wind turbine system 400, the aerial vehicles 301A-C are capable of generating electrical energy during crosswind flight and transferring the electrical energy down one or more electrical conductors in the tethers 404A-C to the ground station 302.

Beneficially, each of the aerial vehicles 301A-C in the airborne wind turbine system 400 may fly in undisturbed air, which may reduce drag on the aerial vehicles 301A-C and may in turn improve generation of electrical energy during crosswind flight. Further, an airborne wind turbine system with first tether portions having different lengths (e.g., first tether portions 404A1-C1) may include more aerial vehicles than an airborne wind turbine system with first tether portions having substantially the same length (e.g., first tether portions 304A1-C1). Adding aerial vehicles to an airborne wind turbine system may improve generation of electrical energy during crosswind flight.

Figure 5:
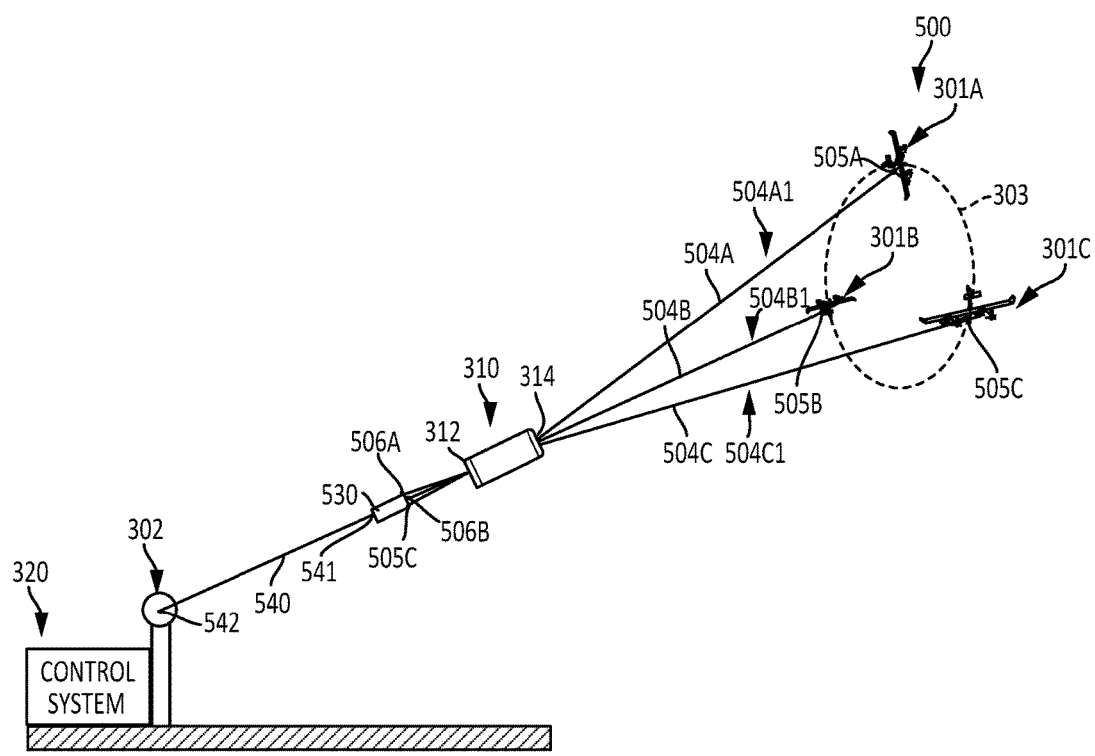
FIG. 5 depicts an airborne wind turbine system with multiple flying aerial vehicles, according to an example embodiment.

FIG. 5 depicts an airborne wind turbine system 500 with flying aerial vehicles 301A-C connected through independent tethers 504A-C to the ground station 302. The airborne wind turbine system 500 is similar to the airborne wind turbine system 300, except that the tethers 504A-C are connected to the ground station 302 through a junction 530 and an auxiliary tether 540.

Distal ends 505A-C of the tethers 504A-C are coupled to a respective aerial vehicle 301A-C, and proximate ends 506A-C of the tethers 504A-C are coupled to the junction 530. Further, a distal end 541 of the auxiliary tether 540 is coupled to the junction 530 and a proximate end 542 of the auxiliary tether 540 is coupled to the ground station 302. The tethers 504A-C may have first tether portions 504A1-C1 between the distal end 314 of the node 310 and distal ends 505A-C.

In the airborne wind turbine system 500, the aerial vehicles 301A-C are capable of generating electrical energy during crosswind flight and transferring the electrical energy down one or more electrical conductors in the tethers 504A-C. Further, the junction 530 and auxiliary tether 540 are capable of transferring the electrical energy from the tethers 504A-C to the ground station 302. The auxiliary tether 540 may take the form of or be similar in form to any of the tethers described herein. Beneficially, the junction 530 and auxiliary tether 540 may reduce weight and/or drag on the airborne wind turbine system 500 compared, for example, to airborne wind turbine systems with multiple tethers that connect the aerial vehicles to the ground station, which may in turn improve generation of electrical energy.

2. Example Nodes

FIGS. 6A-F and 7A-B and 7A1-A5 depict example nodes. The node 310 may take the form of any of the nodes depicted in FIGS. 6A-F and 7A-B and 7A1-A5. For purposes of illustration, tether portions are depicted in FIGS. 6A-F and 7A-B and 7A1-A5 instead complete tethers.

FIGS. 6A and 6D depict side views of a node 600. The node 600 includes a first clamp 616 and a second clamp 618 arranged about multiple tethers 604A-C. The clamps 616 and 618 are coupled to a linear screw 617 and a guide rail 619. Further, the clamps 616 and 618 are surrounded by a shell 610. FIGS. 6A and 6D depict a partial cutaway view of the shell 610. At a proximate end 612 of the shell 610, each of the tethers 604A-C may be adjacent to neighboring tethers 604A-C, and at a distal end 614 of the shell 610, each of the tethers 604A-C may be separated from neighboring tethers 604A-C.

The node 600 may further include a motor 620, a drive belt 622, a pulley 624, a ball screw 626, and a ball nut 628. The motor 620 may include, for example, a servomotor, a linear motor, a magnetic motor, etc. The motor 620, drive belt 622, pulley 624, ball screw 626, ball nut 628, linear screw 617, and guide rail 619 may define a linear drive system 629.

In some embodiments, node 600 may take the form of an inchworm drive. The control system 320 may be configured to operate the clamps 616 and 618 to apply a compressive force to the tethers 604A-C. Applying a compressive force to the tethers 604A-C may provide a tractive force along a respective axis of the tethers 604A-C (e.g., an axis between the proximate end and distal end of the tether), which may in turn enable axial translation of the node 600. Further, the control system 320 may be configured to operate the linear drive system 629 to translate the clamps 616 and 618 along the tethers 604A-C.

FIGS. 6A-F illustrate an example in which the control system 320 translates the node 600 towards proximate ends of tethers 604A-C (e.g., facing the page, left in FIGS. 6A and 6D). FIG. 6A depicts the node 600 in a first position in which the control system 320 may operate the clamp 616 to apply a compressive force to the tethers 604A-C. FIGS. 6B and 6C depict cross-section views of the node 600 along sections A-A and B-B, respectively. As illustrated in FIG. 6B, clamp 616 may include clamp portions 616A-C and arms 613A-C may couple the clamps 616A-C to the shell 610. In the first position, the control system 320 may operate the clamp portions 616A-C to be closed around the tethers 604A-C and apply a compressive force to the tethers 604A-C. The control system 320 may drive the clamp portions 616A-C closed by extending the arms 613A-C from the shell 610. In FIG. 6B, each portion of tethers 604A-C located around the clamp 616 may be adjacent to neighboring tethers 604A-C.

Further, as illustrated in FIG. 6C, clamp 618 may include clamp portions 618A-C and arms 615A-C may couple the clamp portions 618A-C to the shell 610. In the first position, the control system 320 may operate the clamp portions 618A-C to be open around the tethers 304A-C. The control system 320 may drive the clamp portions 618A-C open by retracting arms 615A-C to the shell 610. When the clamp portions 618A-C are open around the tethers 604A-C, the clamp portions 618A-C might not apply a compressive force to the tethers 604A-C. In FIG. 6C, each of portion of tethers 604A-C located around the clamp 618 may be separated from neighboring tethers 604A-C.

Between the first position and the second position (described below) the control system 320 may operate the linear drive system 629 to translate the clamp 618 towards the proximate end 612 of the shell 610. For example, the control system 320 may operate the motor 620 to drive the pulley 624 via the drive belt 622. The driven pulley 624 in turn may drive the ball screw 626 along the linear screw 617 so as to translate the clamp 618.

FIG. 6D depicts the node 600 in a second position in which the control system 320 operates the clamp 618 to apply a compressive force to the tethers 604A-C. FIGS. 6E and 6F depict cross-section views of the node 600 along sections C-C and D-D, respectively. As illustrated in FIG. 6E, the control system 320 may operate the clamp portions 616A-C to be open around the tethers 604A-C. The control system 320 may drive the clamp portions 616A-C open by retracting arms 613A-C to the shell 610. With this arrangement, the control system 320 may release the compressive force applied by the clamp portions 616A-C to the tethers 604A-C in the first position. In FIG. 6D, each of portion of tethers 604A-C located around the clamp 616 may be separated from neighboring tethers 604A-C.

Further, as illustrated in FIG. 6F, the control system 320 may operate the clamp portions 618A-C to be closed around tethers 604A-C and apply a compressive force to the tethers 604A-C. The control system 320 may drive clamp portions 618A-C closed by extending the arms 615A-C from the shell 610. In FIG. 6F, each portion of tethers 604A-C located around the clamp 618 may be adjacent to neighboring tethers 604A-C.

FIGS. 6A-F illustrate an example cycle of the control system 320 operating the clamps 616 and 618 to translate the node 600 along the tethers 604A-C. The control system 320 may operate the clamps 616 and 618 in two or more cycles to translate the node 600 along the tethers 604A-C. Each cycle of the two more cycles may take the form of or be similar in form to the example cycle described above.

Although FIGS. 6A-F illustrate an example in which the control system 320 translates the node 600 towards the proximate ends of the tethers 604A-C, in other examples the control system 320 may operate the clamps 616 and 618 to translate the node 600 towards distal ends of the tethers 604A-C (facing into the page, right in FIGS. 6A and 6D). Further, although FIGS. 6A-F illustrate an example in which the control system 320 operates each of the clamp portions 616A-C and each of the clamp portions 618A-C to be closed around the tethers 604A-C, in other examples the control system 320 may operate less than all of the clamp portions 616A-C and/or the clamp portions 618A-C to be closed around the tethers 604A-C.

Moreover, although the node 600 is described above with two clamps 616 and 618, in other examples, a node may include a plurality of clamps greater than two clamps.

Further, although the clamp 616 is described above with three clamp portions 616A-C and the clamp 618 is described above with three clamp portions 618A-C, in other examples the clamp 616 and/or the clamp 618 may include a plurality of clamp portions greater than or less than three clamp portions. Moreover, example nodes may include other clamp systems, including a clamp system that includes a tension band and a worm gear drive.

Further, the linear drive system 629 may take various different forms. In some embodiments, the linear drive system 629 may include two or more linear screws 617. Further, in some embodiments, the linear drive system 629 may include two or more guide rails 619. Moreover, in some embodiments, the linear drive system 629 might not include the guide rail 619. For example, the linear drive system 629 may include two or more linear screws 617 and might not include the guide rail 619.

In some embodiments, the linear drive system 629 might not include the linear screw 617. For example, the linear drive system 629 may include a pneumatic piston or a hydraulic piston rather than the linear screw 617. Further, in some embodiments, the linear drive system 629 might not include the motor 620. For example, the linear drive system 629 may include a pneumatic actuator or a hydraulic actuator rather than the motor 620. Moreover, in some embodiments, the linear drive system 629 may include a plurality of drive actuators.

Figure 7A:
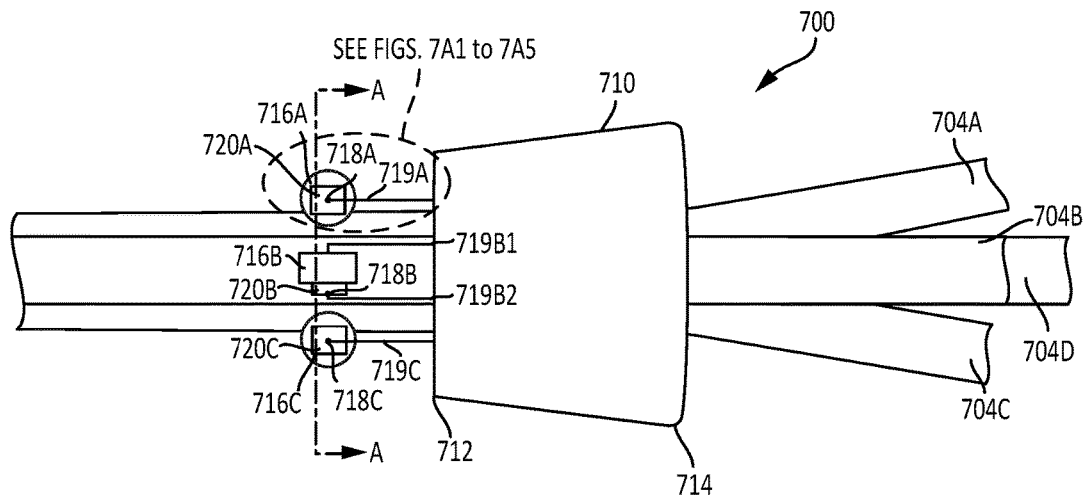
FIG. 7A depicts a side view of a node, according to an example embodiment.

FIG. 7A depicts a side view of a node 700. The node 700 includes convex surfaces 716A-D arranged about the tethers 704A-D. The convex surface 716D is not shown in the side view depicted in FIG. 7A.

Motors 720A-D may be coupled to the convex surfaces 716A-D by axles 718A-D. Further, the convex surfaces 716A-D may be coupled to a housing 710 via supports 719A-D. As illustrated, the convex surface 716B may include two supports 719B1 and 719B2. The other convex surfaces 716A, 716C, and 716D may similarly have two supports. The supports 719A-D may be tensioned to apply pressure to a respective tether of the tethers 704A-D. Each of the supports 719A-D may be configured to vary a degree of contact of a respective convex surface 716A-D with a respective tether 704A-D. The supports 719A-D may be coupled to a proximate end 712 of the housing 710. At the proximate end 712 of the housing 710, each of the tethers 704A-D may be adjacent to neighboring tethers 704A-D. And at a distal end 714 of the housing 710, each of the tethers 704A-D may be separated from neighboring tethers 704A-D. The motor 720D, axle 718D, and support 719D are not shown in the side view depicted in FIG. 7A. The motor 720D, axle 718D, and support 719D may be arranged in a similar way as motors 720A-C, axles 718A-C, and supports 719A-C are arranged.

Figure 7B:
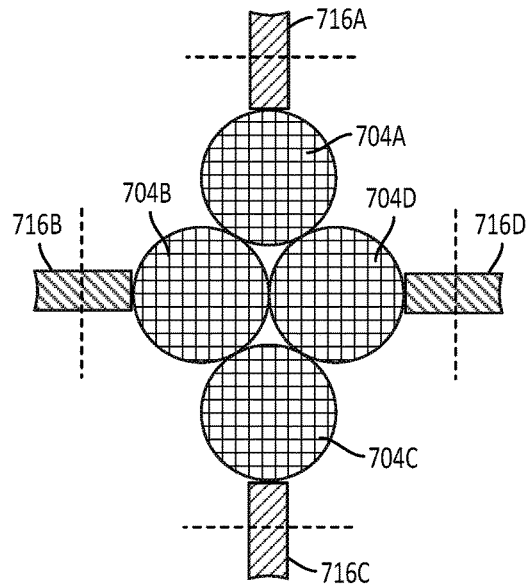
FIG. 7B depicts a cross-section view of aspects of a node illustrated in FIG. 7A, according to an example embodiment.

FIG. 7B depicts a cross-section view of the node 700 along section A-A. The motors 720A-D, the axles 718A-D, and the supports 719A-D are not shown for clarity in FIG. 7B.

The control system 320 may be configured to translate the convex surfaces 716A-D along the tethers 704A-D. For example, the control system 320 may be configured to operate motors 720A-D to translate the convex surfaces 716A-D along the tethers 704A-D.

As illustrated in FIGS. 7A and 7B, the convex surfaces 716A-D include wheels. However, convex surfaces and tethers may take various different forms. In some embodiments of a node, tethers may include surface features, cavities (holes), or protrusions and convex surfaces may be configured to mesh (mate) with the surface features, holes, or protrusions. Such meshing between the convex surfaces and the tethers may improve translation of the node along the tethers.

FIGS. 7A1-A5 depict example convex surfaces and tethers. FIG. 7A1 depicts a side view a square wheel 716A1 arranged on a tether 704A1. The tether 704A1 includes a plurality surface features 707A1 and the square wheel 716A1 may be configured to mesh with the plurality of surface features 707A1. In some embodiments, the plurality of surface features 707A1 may include a plurality of ribs. Although the square wheel 716A1 is described with respect to FIG. 7A1, in other examples, a node may include a wheel with other shapes. The shape of the wheel may be selected to improve better traction of the wheel on the tether 704A1.

FIG. 7A2 depicts a side view of a wheel 716A2 arranged on a tether 704A2. The wheel 716A2 includes a plurality of protrusions 717A2. The tether 704A2 includes a plurality of holes 707A2 and the plurality of protrusions 717A2 may be configured to mesh with the plurality of holes 707A2. In some embodiments, the plurality of protrusions 717A2 may include a plurality of spikes, a plurality of cleats, and/or a plurality of grousers. Although the tether 704A2 described with respect to FIG. 7A2 includes a plurality of holes 707A2, in other examples a tether may include a plurality of apertures and/or a plurality of openings.

FIG. 7A3 depicts a side view of a sprocket 716A3 arranged on a tether 704A3. The tether 704A3 includes a plurality of protrusions 707A3 and the sprocket 716A3 may be configured to mesh with the plurality of protrusions 707A3. In some embodiments, the plurality of protrusions 707A3 may include a plurality of beads and/or a plurality of ribbed features.

FIG. 7A4 depicts a side view of a sprocket 716A4 arranged on a tether 704A4. The tether 704A4 may include a plurality of chain-link segments 707A4 and the sprocket 716A4 may be configured to mesh with the plurality of chain-link segments 707A4.

FIG. 7A5 depicts a side view of a belt assembly 716A5 arranged on a tether 704A5. The belt assembly 716A5 may include a belt 715A5 and drive wheels 713A51 and 713A52. The belt assembly 716A5 may be configured to translate along the tether 704A5.

Any of the convex surfaces 716A-D may take the form of the square wheel 716A1, wheel 716A2, sprocket 716A3, sprocket 716A4, or belt assembly 716A5; and any of the tethers 704A-D may take the form of tethers 704A1-A5. In some embodiments, the convex surfaces 716A-D may be the same. However, in other embodiments, at least two of the convex surfaces may be different. Further, in some embodiments, the tethers 704A-D may be the same. However, in other embodiments, at least two of the tethers 704A-D may be different.

The convex surfaces 716A-D may include other components as well, such as rollers. In some embodiments, the convex surfaces 716A-D may have extended widths and/or shapes that may enable rotational misalignment. Further, in some embodiments, the axles 718A-D may be parallel with a respective axis of the tethers 704A-D and the convex surfaces 716A-D may be shaped like a worm gear. Moreover, in some embodiments, the node 700 may further include a guide feature. The guide feature may align the plurality of convex surfaces 716A-D with the tethers 704A-D.

Although the node 700 described above includes four convex surfaces 716A-D, in other examples, a node may include a plurality of convex surfaces that is greater than or less than four convex surfaces. Further, although the node 700 described above is arranged about four tethers 704A-D, in other examples, a node may be arranged about a plurality of tethers that is greater than or less than four tethers.

3. Systems With a Node That Might Not Translate Along Multiple Tethers

Figure 8:
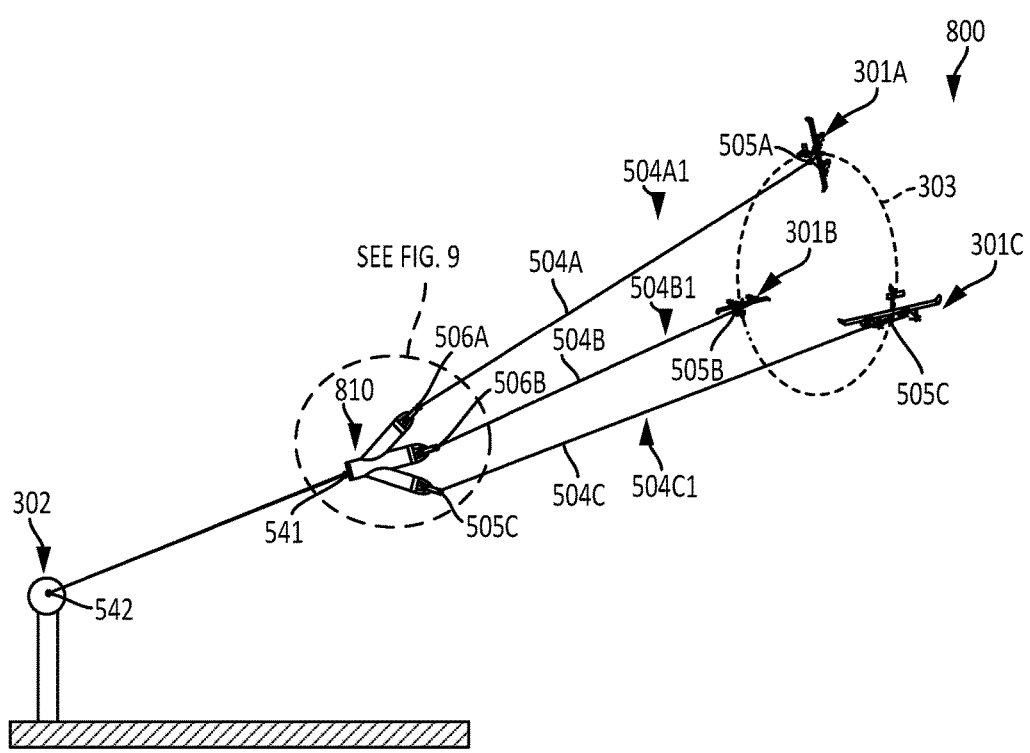
FIG. 8 depicts an airborne wind turbine system with multiple flying aerial vehicles, according to an example embodiment.

FIG. 8 depicts an airborne wind turbine system 800 with flying aerial vehicles 301A-C connected through the tethers 504A-C to the ground station 302. The airborne wind turbine system 800 is similar to the airborne wind turbine system 500, except that the tethers 504A-C are coupled to a node 810. The node 810 may be static and might not translate along the tethers 504A-C. With this arrangement, the lengths of first tether portions 504A1-C1 might not vary. As illustrated, distal ends 505A-C of the tethers 504A-C are coupled to a respective aerial vehicle 301A-C, proximate ends 506A-C of the tethers 504A-C are coupled to the node 810, the distal end 541 of the auxiliary tether 540 is coupled to the node 810, and the proximate end 542 of the auxiliary tether 540 is coupled to the ground station 302.

Figure 9:
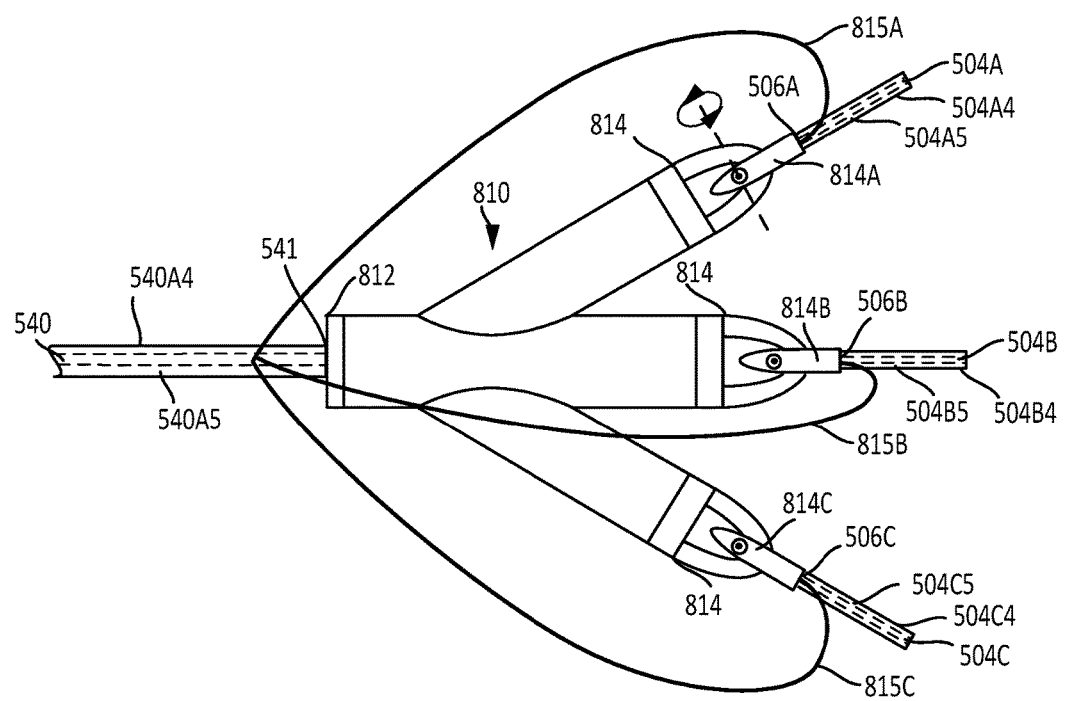
FIG. 9 depicts aspects of a node and tethers illustrated in FIG. 8, according to an example embodiment.

FIG. 9 depicts aspects of the node 810, the tethers 504A-C, and the auxiliary tether 540. The distal end 541 of the auxiliary tether 540 may be coupled to the proximate end 812 of the node 810. The auxiliary tether 540 may include a body 540A4, which may be coupled to the proximate end 812 of the node 810.

The node 810 may include multiple terminations 814A-C at a distal end 814 of the node 810. The terminations 814A-C may be rotatable around at least two axes (e.g., an azimuth axis and an elevation axis). Proximate ends 506A-C of the tethers 504A-C may be coupled to a respective termination 814A-C. The tethers 504A-C may include a respective body 504A4-C4, which may be coupled to a respective termination 814A-C. The terminations 814A-C may help to enable the tethers 504A-C to change a tether angle during crosswind flight of the aerial vehicles 301A-C, which may in turn reduce bending strain of the tethers 504A-C.

Further, the auxiliary tether 540 may include one or more electrical conductors 540A5, and the tethers 504A-C may include one or more electrical conductors 504A5-C5. The electrical conductors 540A5 may be coupled to the electrical conductors 504A5-C5 by service (electrical) loops 815A-C. With this arrangement, electrical energy may be transferred from the electrical conductors 504A5-C5 to the electrical conductors 540A5 via the service loops 815A-C.

Figure 10:
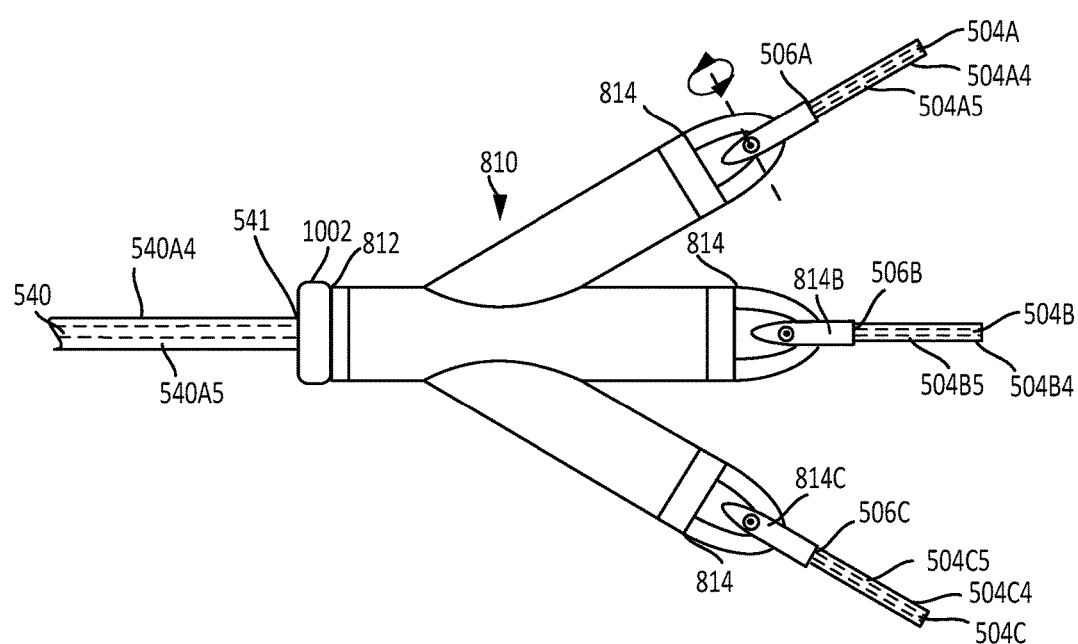
FIG. 10 depicts aspects of a node and tethers, according to an example embodiment.

FIG. 10 depicts another embodiment of the auxiliary tether 540 coupled to the tethers 504A-C by the node 810. As illustrated, a slip ring 1002 is disposed between the auxiliary tether 540 and the proximate end 812 of the node 810. The electrical conductors 540A5 are coupled to the electrical conductors 504A5-C5 via the slip ring 1202. With this arrangement, the node 810 might not include service loops 815A-C.

Although the node 810 is depicted with three terminations 814A-C, in other examples the node 810 may include a plurality of terminations greater than or less than three terminations.

Other airborne wind turbine systems may include the node 810 as well. For example, an airborne wind turbine system with tethers that have different lengths (e.g., tethers 404A-C) may include the node 810. In such an example, the airborne wind turbine system may be similar to the airborne wind turbine system 400.

4. Offshore Systems

Figure 11:
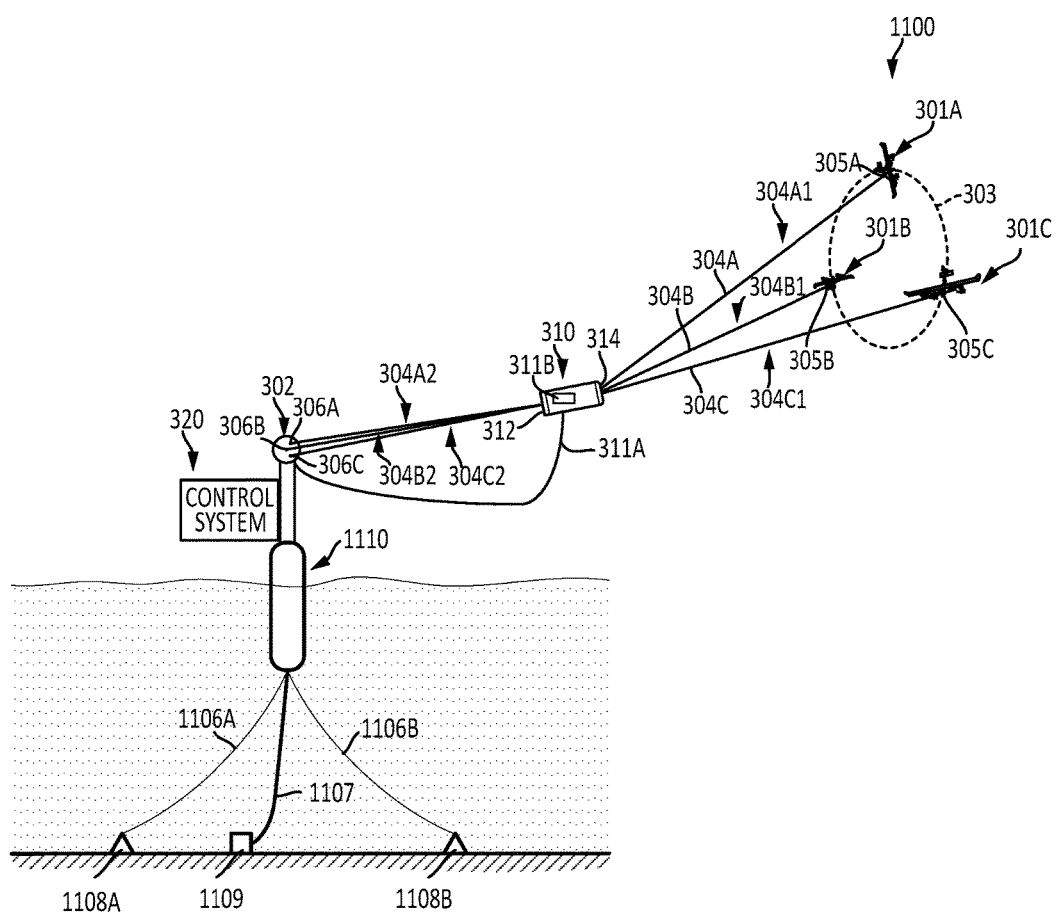
FIG. 11 depicts an airborne wind turbine system with multiple flying aerial vehicles, according to an example embodiment.

Although the ground station 302 described above is located on land, in other examples, a ground station may be located on an offshore platform. FIG. 11 depicts airborne wind turbine system 1100 with the flying aerial vehicles 301A-C connected through tethers 304A-C to the ground station 302. The airborne wind turbine system 1100 is similar to the airborne wind turbine system 300, except the ground station 302 is coupled to a ground station base 1110. In some embodiments, the ground station base 1110 may include a spar buoy. The base 1110 may be anchored via mooring lines 1106A-B to moorings 1108A-B, respectively. A ground-side electrical conductor 1107 may provide an electrical pathway between the electrical conductors in the tethers 304A-C and an energy sink 1109.

Other airborne wind turbine systems may include the ground station base 1110 as well. For example, an airborne wind turbine system with tethers that have different lengths (e.g., tethers 404A-C), a junction and auxiliary tether (e.g., junction 530 and auxiliary tether 540), or a node that may be static (e.g., the node 810) may include the ground station base 1110. In such examples, the airborne wind turbine system may be similar to the airborne wind turbine system 400, the airborne wind turbine system 500, or the airborne wind turbine system 800.

III. CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

The invention claimed is:

1. An airborne wind turbine system, comprising:
   a ground station;
   a plurality of aerial vehicles;
   a plurality of tethers, wherein each tether of the plurality of tethers comprises an electrical conductor, wherein a distal end of each tether of the plurality of tethers is coupled to a respective aerial vehicle of the plurality of aerial vehicles, and wherein a proximate end of each tether of the plurality of tethers is coupled to the ground station;
   a node coupled to the plurality of tethers, wherein the plurality of tethers pass through the node, wherein, at a proximate end of the node, each tether of the plurality of tethers is adjacent to neighboring tethers of the plurality of tethers, wherein, at a distal end of the node, each tether of the plurality of tethers is separated from the neighboring tethers of the plurality of tethers, wherein the node comprises a drive system, and wherein the drive system comprises:
   a first clamp coupled to the node,
   a second clamp coupled to the node, and
   a linear drive system; and a control system configured to operate the drive system to translate the node along the plurality of tethers, wherein the control system is further configured to:
  operate the first clamp to apply a compressive force to the plurality of tethers,
  operate the linear drive system to translate the second clamp,
  operate the second clamp to apply a second compressive force to the plurality of tethers, and
  operate the linear drive system to translate the node.

2. The airborne wind turbine system of claim 1, wherein each tether of the plurality of tethers has a length between the distal end of the node and respective aerial vehicle, and wherein the lengths of each tether of the plurality of tethers are substantially the same.

3. The airborne wind turbine system of claim 1, wherein each tether of the plurality of tethers has a length between the distal end of the node and respective aerial vehicle, and wherein the lengths of each tether of the plurality of tethers is different than the lengths of the other tethers in the plurality of tethers.

4. The airborne wind turbine system of claim 1 further comprising:
  a junction between the ground station and the node, wherein the proximate end of each tether of the plurality of tethers is coupled to the junction; and
  an auxiliary tether, wherein the auxiliary tether comprises a second electrical conductor, wherein a distal end of the auxiliary tether is coupled to the junction, and wherein a proximate end of the auxiliary tether is coupled to the ground station.

5. The airborne wind turbine system of claim 1, wherein the node comprises a proximate opening at the proximate end of the node and a distal opening at the distal end of the node, and wherein a diameter of the distal opening is greater than a diameter of the proximate opening.

6. An airborne wind turbine system, comprising:
  a ground station;
  a plurality of aerial vehicles;
  a plurality of tethers, wherein each tether of the plurality of tethers comprises an electrical conductor, wherein a distal end of each tether of the plurality of tethers is coupled to a respective aerial vehicle of the plurality of aerial vehicles, and wherein a proximate end of each tether of the plurality of tethers is coupled to the ground station;
  a node coupled to the plurality of tethers, wherein the plurality of tethers pass through the node, wherein, at a proximate end of the node, each tether of the plurality of tethers is adjacent to neighboring tethers of the plurality of tethers, wherein, at a distal end of the node, each tether of the plurality of tethers is separated from the neighboring tethers of the plurality of tethers, wherein the node comprises a drive system, wherein the drive system comprises a plurality of convex surfaces coupled to the node, wherein each tether of the plurality of tethers comprises a plurality of cavities, wherein each convex surface of the plurality of convex surfaces comprises a plurality of protrusions, and wherein, for each tether, a convex surface of the plurality of convex surfaces is configured to mesh with the plurality of cavities; and
  a control system configured to operate the drive system to translate the node along the plurality of tethers, wherein the control system is further configured to translate the plurality of convex surfaces along the plurality of tethers.

7. The airborne wind turbine system of claim 6, wherein each tether of the plurality of tethers has a length between the distal end of the node and respective aerial vehicle, and wherein the lengths of each tether of the plurality of tethers are substantially the same.

8. The airborne wind turbine system of claim 6, wherein each tether of the plurality of tethers has a length between the distal end of the node and respective aerial vehicle, and wherein the lengths of each tether of the plurality of tethers is different than the lengths of the other tethers in the plurality of tethers.

9. The airborne wind turbine system of claim 6 further comprising:
  a junction between the ground station and the node, wherein the proximate end of each tether of the plurality of tethers is coupled to the junction; and
  an auxiliary tether, wherein the auxiliary tether comprises a second electrical conductor, wherein a distal end of the auxiliary tether is coupled to the junction, and wherein a proximate end of the auxiliary tether is coupled to the ground station.

10. The airborne wind turbine system of claim 6, wherein the node comprises a proximate opening at the proximate end of the node and a distal opening at the distal end of the node, and wherein a diameter of the distal opening is greater than a diameter of the proximate opening.

11. An airborne wind turbine system, comprising:
  a ground station;
  a plurality of aerial vehicles;
  a plurality of tethers, wherein each tether of the plurality of tethers comprises an electrical conductor, wherein a distal end of each tether of the plurality of tethers is coupled to a respective aerial vehicle of the plurality of aerial vehicles, and wherein a proximate end of each tether of the plurality of tethers is coupled to the ground station;
  a node coupled to the plurality of tethers, wherein the plurality of tethers pass through the node, wherein, at a proximate end of the node, each tether of the plurality of tethers is adjacent to neighboring tethers of the plurality of tethers, wherein, at a distal end of the node, each tether of the plurality of tethers is separated from the neighboring tethers of the plurality of tethers, and wherein the node comprises a drive system, wherein the drive system comprises a plurality of convex surfaces coupled to the node, wherein each tether of the plurality of tethers comprises a plurality of protrusions, wherein each convex surface of the plurality of convex surfaces comprises a sprocket, and wherein, for each tether, the sprocket is configured to mesh with the plurality of protrusions; and
  a control system configured to operate the drive system to translate the node along the plurality of tethers, wherein the control system is further configured to translate the plurality of convex surfaces along the plurality of tethers.

12. The airborne wind turbine system of claim 11, wherein each tether of the plurality of tethers has a length between the distal end of the node and respective aerial vehicle, and wherein the lengths of each tether of the plurality of tethers are substantially the same.

13. The airborne wind turbine system of claim 11, wherein each tether of the plurality of tethers has a length between the distal end of the node and respective aerial vehicle, and wherein the lengths of each tether of the plurality of tethers is different than the lengths of the other tethers in the plurality of tethers.

14. The airborne wind turbine system of claim 11 further comprising:
- a junction between the ground station and the node, wherein the proximate end of each tether of the plurality of tethers is coupled to the junction; and
- an auxiliary tether, wherein the auxiliary tether comprises a second electrical conductor, wherein a distal end of the auxiliary tether is coupled to the junction, and wherein a proximate end of the auxiliary tether is coupled to the ground station.

15. The airborne wind turbine system of claim 11, wherein the node comprises a proximate opening at the proximate end of the node and a distal opening at the distal end of the node, and wherein a diameter of the distal opening is greater than a diameter of the proximate opening.

* * * * *